US006976593B2

(12) United States Patent
Fierstein

(10) Patent No.: US 6,976,593 B2
(45) Date of Patent: Dec. 20, 2005

(54) BICYCLE STAND AND METHOD OF USE

(76) Inventor: Bradley R. Fierstein, 14 Alta La., Chappaqua, NY (US) 10514

(\*) Notice: Subject to any disclaimer, the term of this patent is extended or adjusted under 35 U.S.C. 154(b) by 0 days.

(21) Appl. No.: 10/637,983

(22) Filed: Aug. 8, 2003

(65) Prior Publication Data

US 2004/0031766 A1    Feb. 19, 2004

(51) Int. Cl.[7] .............................................. A47F 7/00
(52) U.S. Cl. ............................................... 211/17
(58) Field of Search ........................... 211/17, 20, 21, 211/23; 482/57; 280/29, 200

(56) References Cited

U.S. PATENT DOCUMENTS

| 417,550 A | 12/1889 | Döring et al. ............... 280/296 |
| 537,583 A | 4/1895 | Reid et al. .................... 211/22 |
| 554,454 A | 2/1896 | McKanna .................... 280/296 |
| 598,298 A | 2/1898 | Walton et al. ................. 211/22 |
| 603,422 A \* | 5/1898 | Burkhardt ..................... 211/22 |
| 611,856 A | 10/1898 | Brown et al. ................. 211/20 |
| 617,028 A | 1/1899 | Koehler ....................... 280/294 |
| 622,642 A | 4/1899 | Tomlinson .................... 211/22 |
| 631,948 A | 8/1899 | Bush ........................... 211/17 |
| 653,681 A | 7/1900 | Lee ............................. 280/296 |
| 3,712,637 A \* | 1/1973 | Townsend .................... 280/293 |
| 3,980,320 A | 9/1976 | Marchello .................... 280/293 |
| 4,979,759 A | 12/1990 | Solovay ....................... 280/293 |
| 5,385,246 A | 1/1995 | Grossnickle .................. 211/22 |
| 5,489,030 A | 2/1996 | Kolbeck et al. ............... 211/22 |
| 5,553,715 A | 9/1996 | Brotz ........................... 211/5 |
| 5,607,064 A | 3/1997 | Fourel .......................... 211/5 |

\* cited by examiner

*Primary Examiner*—Sarah Purol
(74) *Attorney, Agent, or Firm*—Fish & Neave Group of Ropes & Gray LLP

(57) ABSTRACT

A bicycle stand that supports a bicycle frame to maintain the bicycle in an upright position and method of use are provided. The bicycle stand includes a first portion that supports a frame member of the bicycle and a second portion having a front-wheel-engaging member that interacts with a front wheel of the bicycle. The second portion of the bicycle stand includes ground-engaging members that contact a surface upon which the bicycle rests. The ground-engaging members contact the surface on opposite sides of a plane defined by the frame of the bicycle.

20 Claims, 12 Drawing Sheets

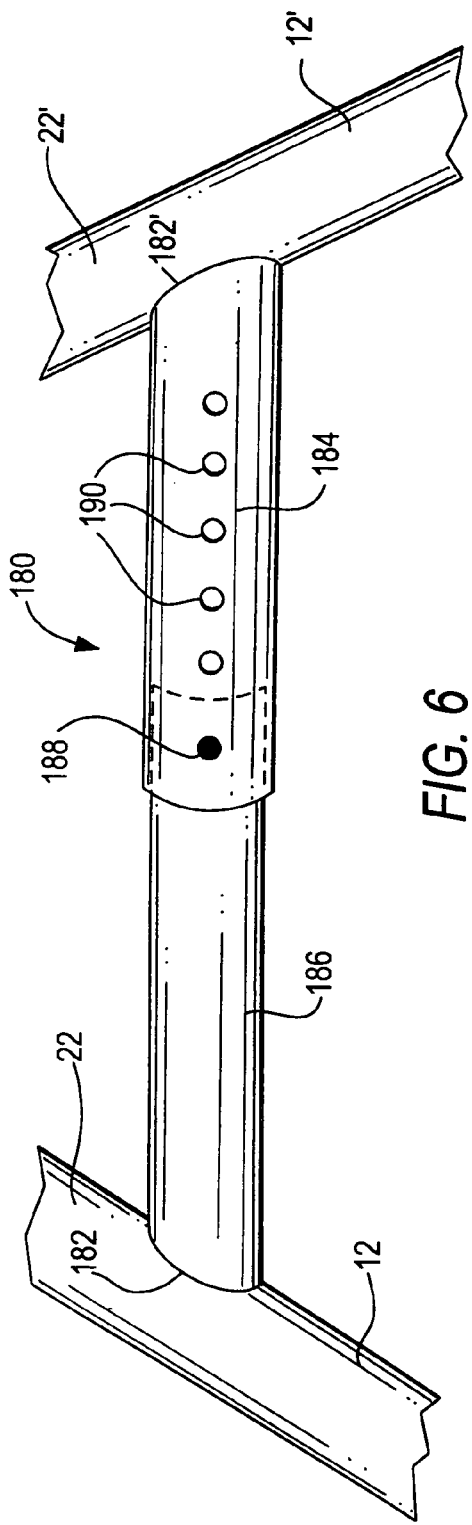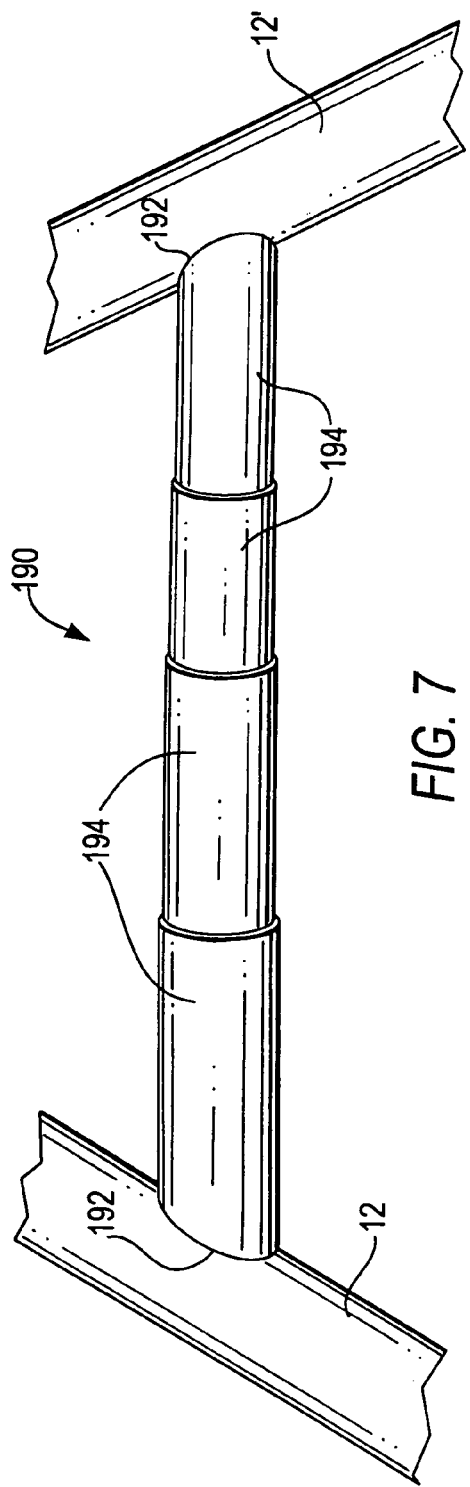

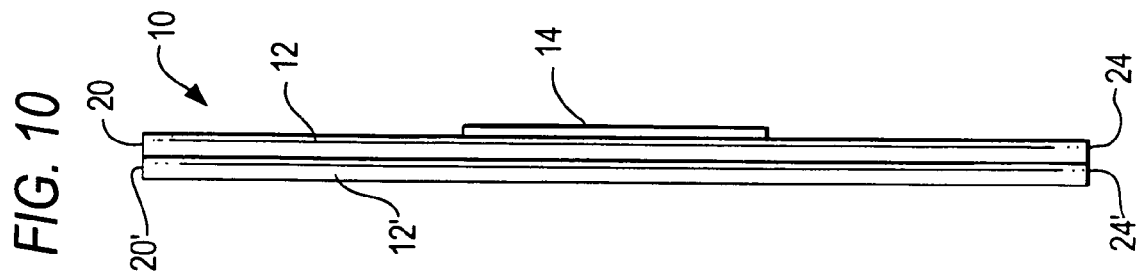
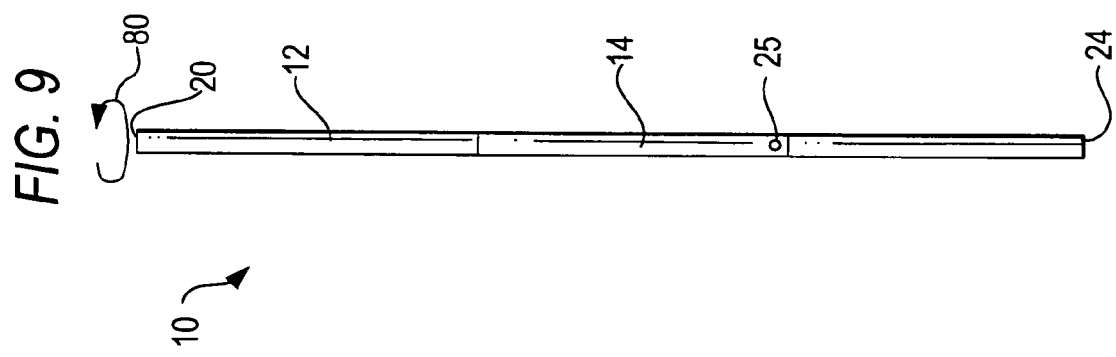
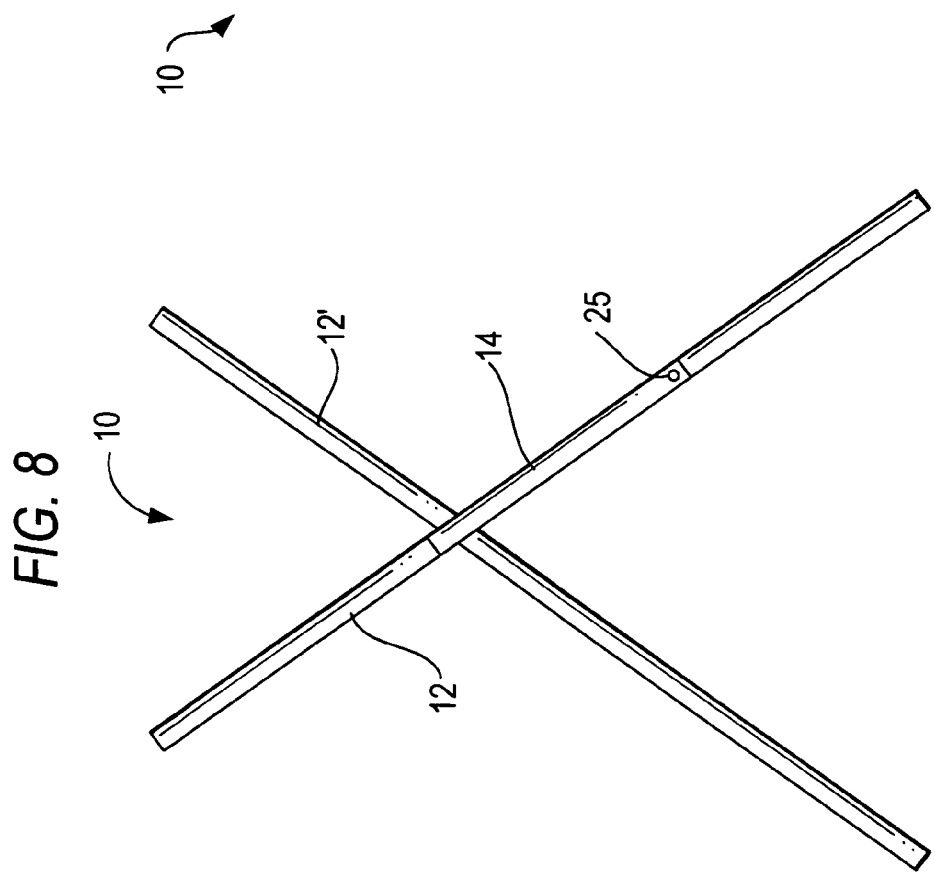

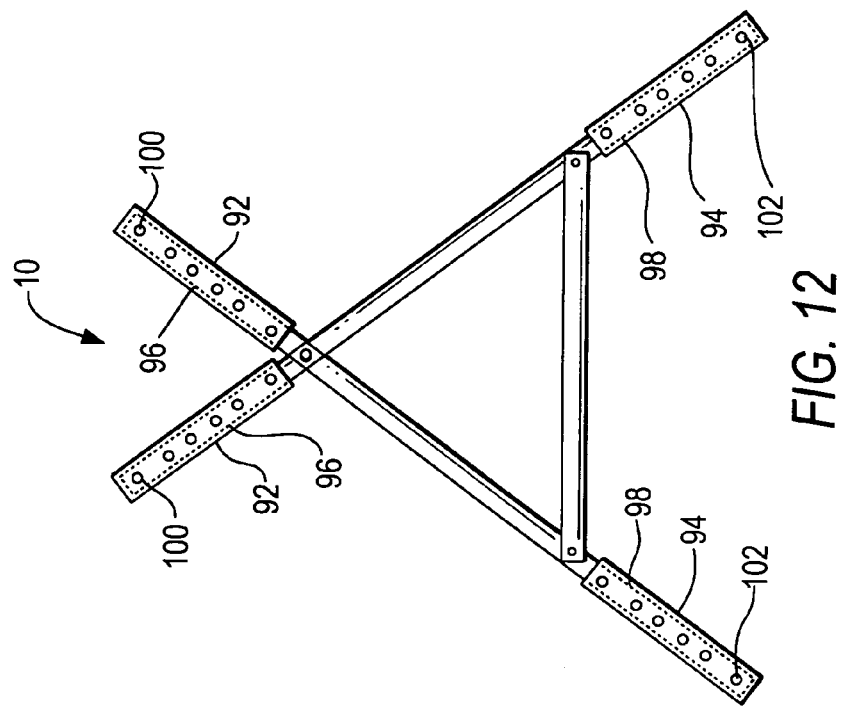
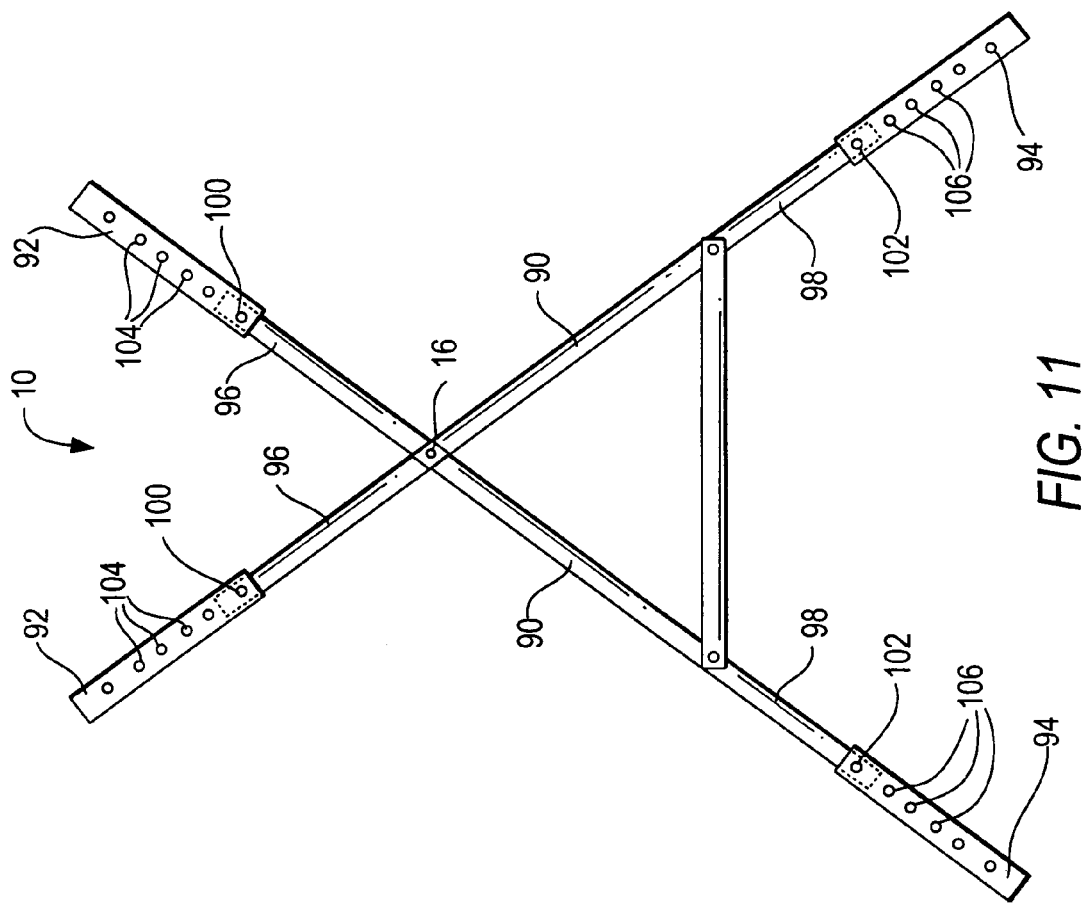

BICYCLE STAND AND METHOD OF USE

BACKGROUND OF THE INVENTION

This invention relates to a bicycle stand and method of use. More particularly, this invention relates to a bicycle stand that supports a bicycle frame to maintain the bicycle in an upright position and method of use.

Traditionally, a kickstand has been used to allow a bicycle to stand in an upright position when the bicycle is not in use. A typical kickstand is mounted to a bicycle and is adapted to swing down to contact the ground on which the bicycle rests. Certain bicycles, however, are currently used without kickstands. Such bicycles include, for example, mountain bikes and high-end road bikes. The reasons for excluding kickstands from certain bicycles include reducing the weight of road and mountain bikes and promoting safety in the use of mountain bikes, as kickstands may be hazardous in the off-road conditions over which a mountain bike traverses. Due to the exclusion of a kickstand, such bicycles lack the ability to stand in an upright position when not in use. A bicycle without a kickstand, therefore, often must be propped against a vertical surface, such as a wall or tree, or placed on the ground in order to support the bicycle when not in use. However, propping a bicycle against a vertical surface or placing the bicycle on the ground for storage of the bicycle, or to perform a maintenance activity such as cleaning the bicycle, can be unstable, inconvenient, and unsafe.

Accordingly, it would be desirable to provide a bicycle stand that supports a bicycle frame to maintain the bicycle in an upright position.

SUMMARY OF THE INVENTION

In accordance with the present invention, a bicycle stand that supports a bicycle frame to maintain the bicycle in an upright position and method of use are provided.

In some embodiments of the present invention, the bicycle stand supports a bicycle in an upright position with respect to a surface. The bicycle has a frame defining a plane of the bicycle. The bicycle stand includes a first portion and a second portion. The first portion of the bicycle stand presents a pocket to support a frame member of the bicycle in a support configuration. The second portion of the bicycle stand includes a first ground-engaging member, a second ground-engaging member, and a front-wheel-engaging member. The first and second ground-engaging members contact the surface on opposite sides of the plane of the bicycle. A front wheel of the bicycle interacts with the front-wheel-engaging member in the support configuration.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 is a simplified elevational view of yet another illustrative front-wheel-engaging member for a bicycle stand in accordance with the present invention;

FIG. 7 is a simplified elevational view of still another illustrative front-wheel-engaging member for a bicycle stand in accordance with the present invention;

FIG. 8 is a simplified elevational view of the bicycle stand of FIG. 1A with its front-wheel-engaging member in a position for storage in accordance with the present invention;

FIG. 9 is a simplified elevational view of the bicycle stand of FIG. 8 with its front-wheel-engaging member and elongated members in position for storage in accordance with the present invention;

FIG. 10 is another simplified elevational view of the bicycle stand of FIG. 8 with its front-wheel-engaging member and elongated members in position for storage in accordance with the present invention;

FIG. 11 is a simplified elevational view of an illustrative bicycle stand having elongated members that change in length in accordance with the present invention;

FIG. 12 is a simplified elevational view of the bicycle stand of FIG. 11 with its elongated members collapsed to a shorter length in accordance with the present invention;

DETAILED DESCRIPTION OF THE INVENTION

In accordance with the present invention, a bicycle stand that supports a bicycle frame to maintain the bicycle in an upright position and method of use are provided. The bicycle stand includes a first portion that supports a frame member of the bicycle and a second portion that interacts with a front wheel of the bicycle to prevent the bicycle from rolling, thereby maintaining the bicycle in a stable, upright position with respect to a surface. The second portion of the bicycle stand includes ground-engaging members that contact the surface upon which the bicycle rests.

In some embodiments of the present invention, the first portion of the bicycle stand may include two elongated members attached to one another such that the first portion is substantially V-shaped. A frame member of a bicycle may reside within the V-shaped region, or "pocket," defined by the two elongated members.

In some embodiments of the present invention, the first portion of the bicycle stand may be substantially U-shaped. A frame member of a bicycle may reside within the U-shaped region, or "pocket," defined by the first portion.

In some embodiments of the present invention, the second portion of the bicycle stand may include two elongated members attached to one another such that the second portion is shaped substantially like a downward-facing "V." A front-wheel-engaging member may be attached to the second portion of the bicycle stand. A front wheel of a bicycle may interact with the front-wheel-engaging member of the second portion.

In some embodiments of the present invention, the first portion and the second portion of the bicycle stand may have members in common. For example, the bicycle stand may include two elongated members that are attached to one another forming a substantially X-shaped structure. This X-shaped structure includes an upward-facing V-shaped portion (i.e., the first portion of the bicycle stand) and a downward-facing V-shaped portion (i.e., the second portion of the bicycle stand).

In some embodiments of the present invention, the first portion and the second portion of the bicycle stand may be separated by an elongated member extending therebetween.

FIGS. 1A–14 show various embodiments of a bicycle stand that supports a bicycle frame to maintain the bicycle in an upright position in accordance with the present invention.

Figure 1A:
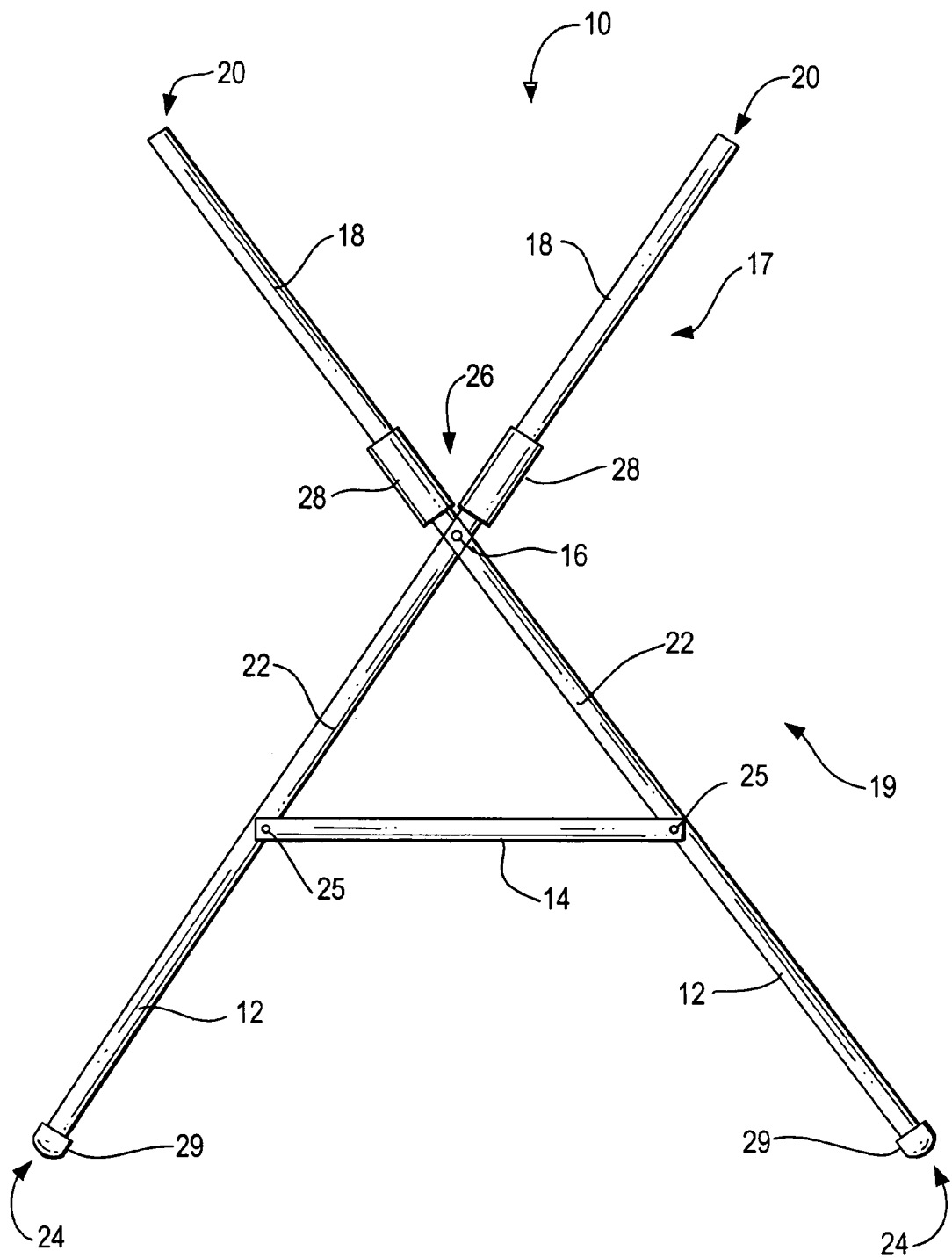
FIG. 1A is a simplified elevational view of an illustrative bicycle stand in accordance with the present invention.

FIG. 1A is a simplified elevational view of an illustrative bicycle stand 10 in accordance with the present invention. Bicycle stand 10 supports a bicycle frame to maintain the bicycle in an upright position (see, for example, FIG. 15, which will be described in detail hereinbelow).

Figure 1B:
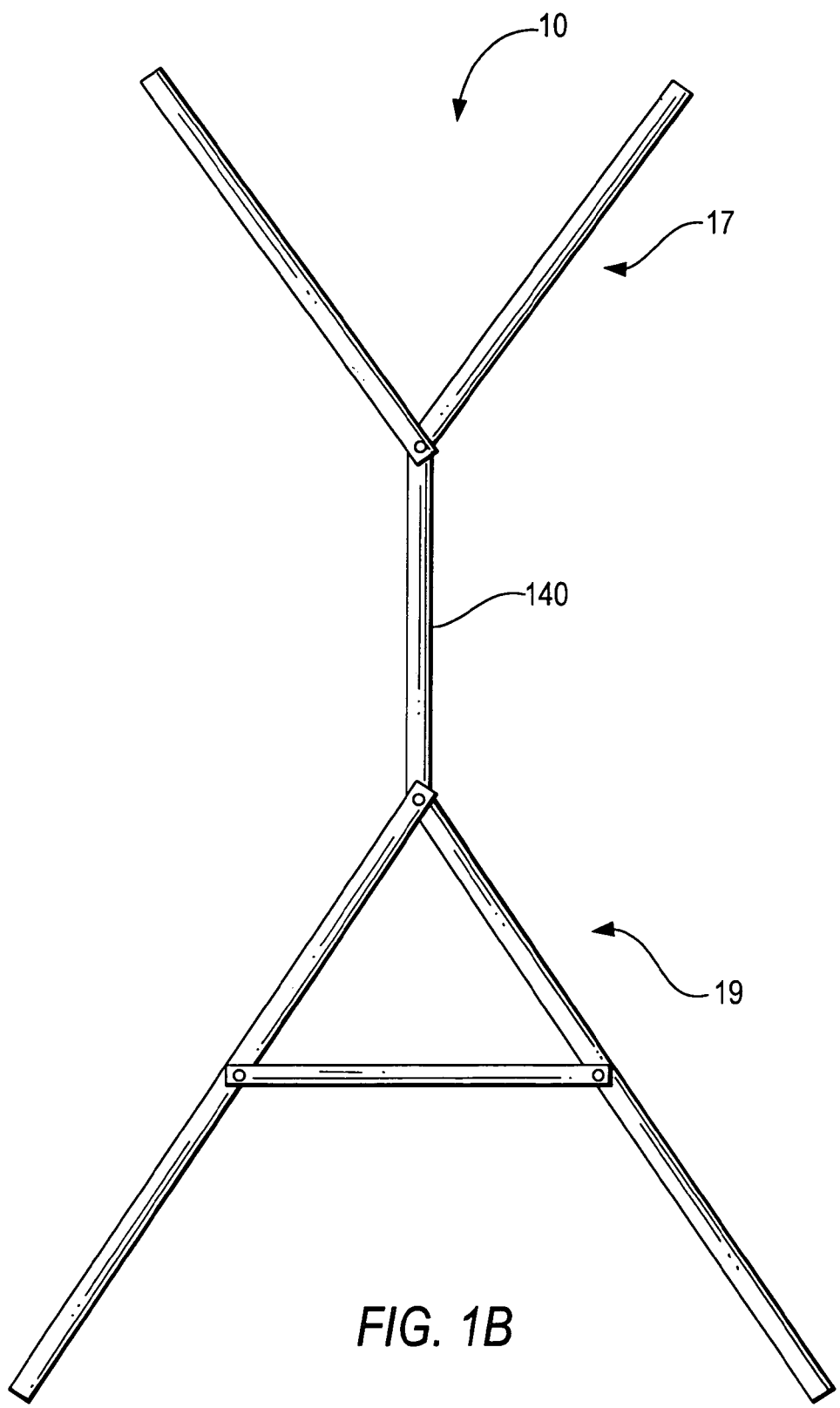
FIG. 1B is a simplified elevational view of another illustrative bicycle stand in accordance with the present invention.

Bicycle stand 10 is a structure having a first portion for supporting a frame member of a bicycle and a second portion for interacting with a front wheel of the bicycle. In one embodiment of the present invention, as shown in FIG. 1A, first portion 17 and second portion 19 of bicycle stand 10 have members in common that are attached to one another forming a substantially X-shaped structure. In another embodiment of the present invention, as shown in FIG. 1B, an elongated member 140 extends between first portion 17 and second portion 19 of bicycle stand 10. In yet another embodiment of the present invention, as shown in FIG. 1C, second portion 150 includes an additional elongated member 152.

Figure 1C:
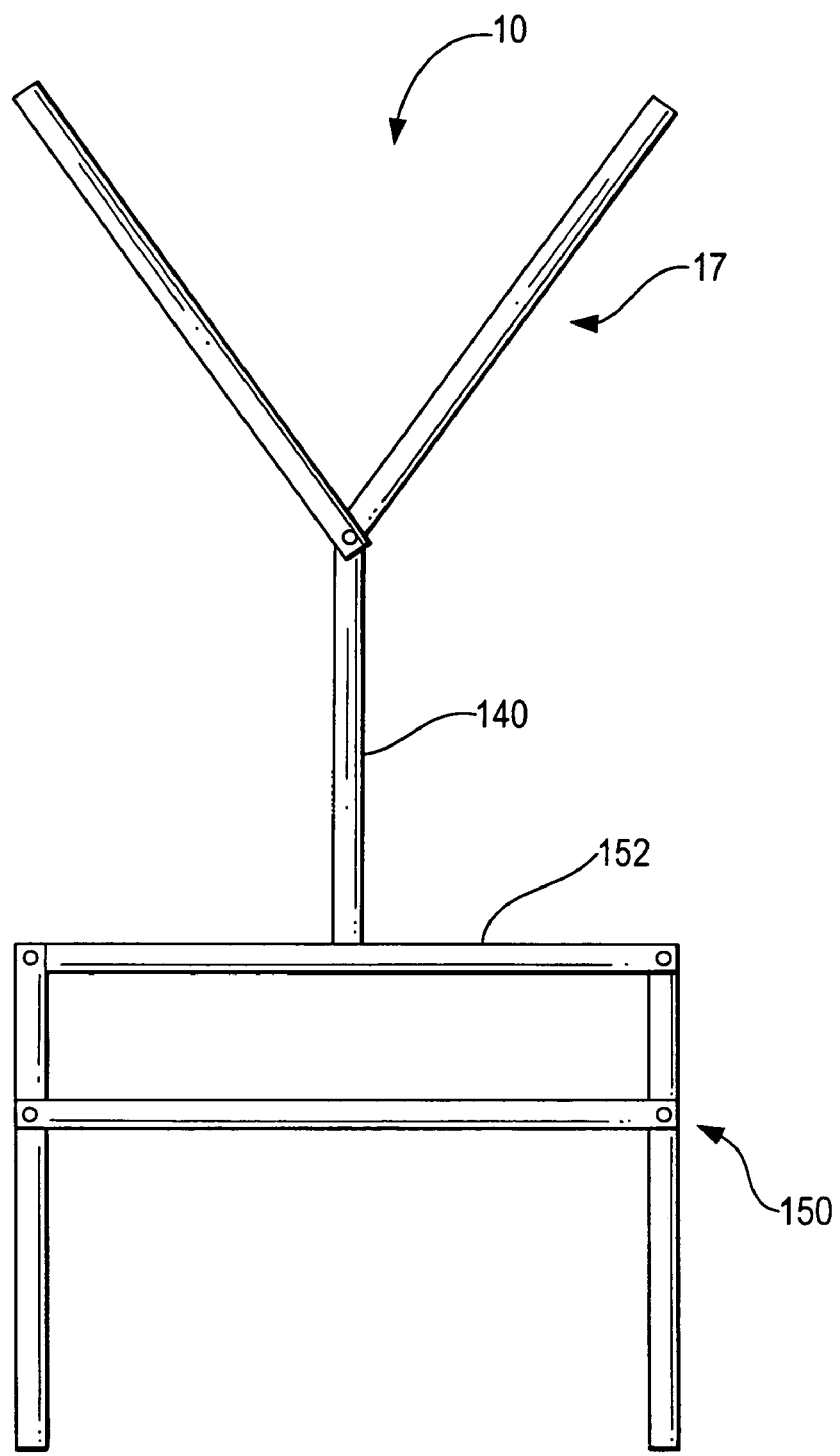
FIG. 1C is a simplified elevational view of yet another illustrative bicycle stand in accordance with the present invention.
Figure 1E:
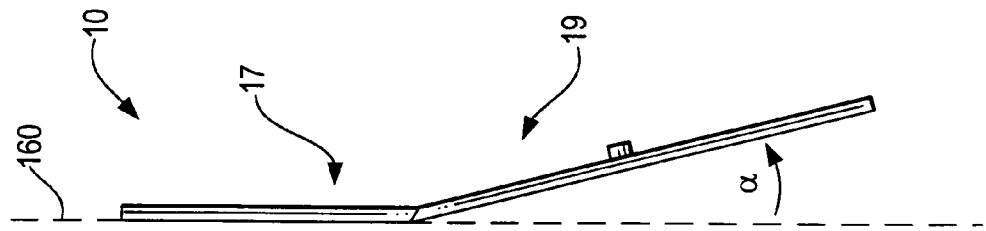
FIGS. 1D and 1E are simplified elevational views of still another illustrative bicycle stand in accordance with the present invention.
Figure 1D:
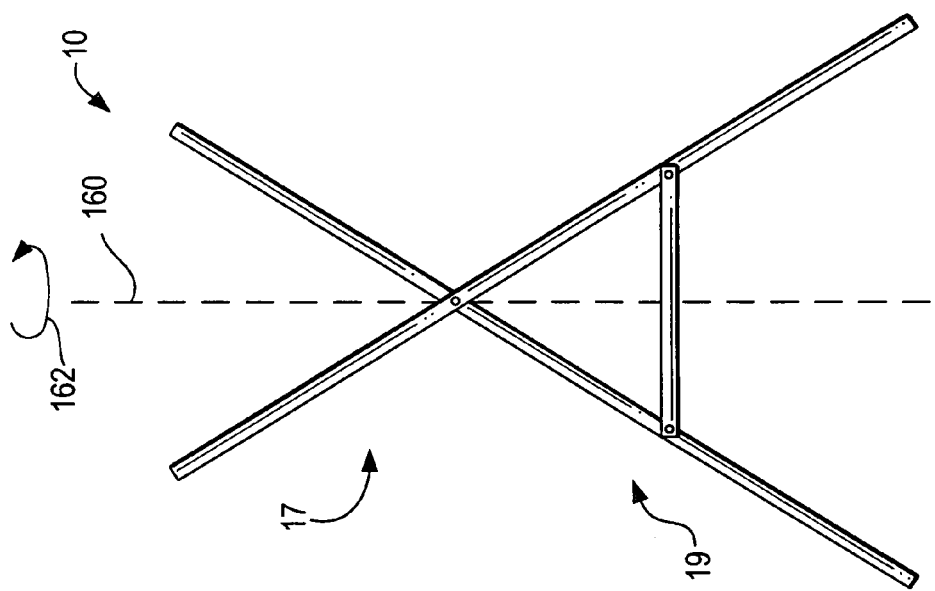

In still-another embodiment of the present invention, as shown in FIGS. 1D and 1E, first portion 17 and second portion 19 are bent with respect to an axis 160. In other words, first portion 17 and second portion 19 do not lie within the same plane. FIG. 1D shows a front view of bicycle stand 10. FIG. 1E shows a side view of bicycle stand 10, as rotated 90° in the direction of arrow 162 about axis 160. As shown, second portion 19 defines an angle $\alpha$ with respect to axis 160.

Figure 1F:
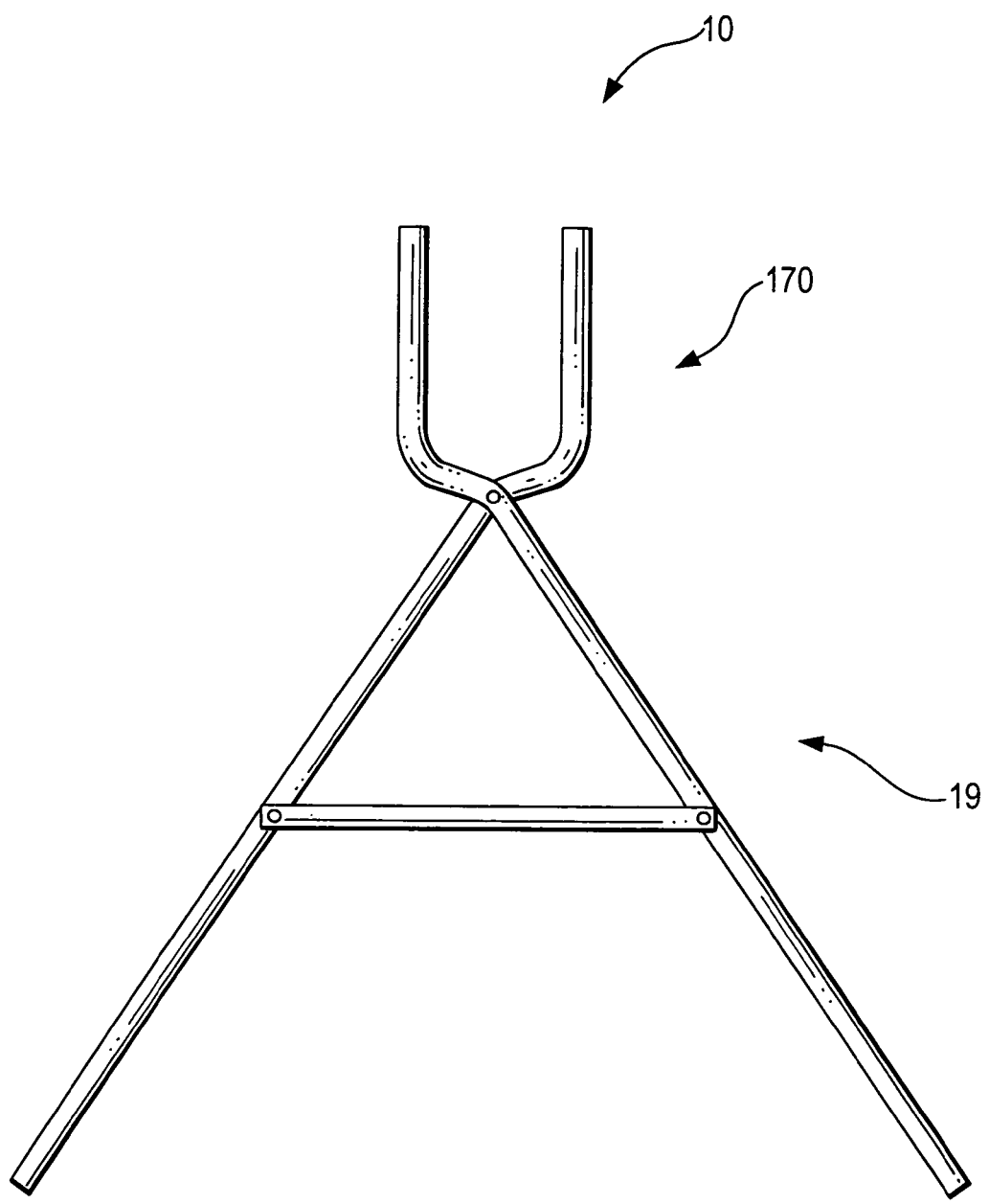
FIG. 1F is a simplified elevational view of yet another illustrative bicycle stand in accordance with the present invention.

In yet another embodiment of the present invention, as shown in FIG. 1F, first portion 170 is substantially U-shaped.

As shown in FIGS. 1A–1F, any suitable structure having a first portion and a second portion may be used to support a bicycle frame to maintain the bicycle in an upright position. As shown in FIGS. 1B and 1C, for example, an optional elongated member may extend between the first and second portions. A common attribute of the embodiments of bicycle stand 10 shown in FIGS. 1A–1F, and of any other suitable embodiment of the bicycle stand of the present invention, is that a first portion of the structure supports a frame member of a bicycle and the second portion of the structure interacts with a front wheel of the bicycle when the bicycle stand is in a position to support the bicycle.

The bicycle stand of the present invention will now be described hereinbelow referring to the embodiment of bicycle stand 10 shown in FIG. 1A. This is merely for simplicity, and one of skill in the art will realize that the description that follows may be applicable to any embodiment of the bicycle stand of the present invention.

Referring back to FIG. 1A, bicycle stand 10 includes elongated members 12 and front-wheel-engaging member 14. Elongated members 12 and front-wheel-engaging member 14 may be constructed of any rigid material, such as a metal (e.g., aluminum, steel, stainless steel, titanium), a plastic (e.g., polyethylene ("PE"), polyethylene terephthalate ("PET"), polypropylene ("PP"), polystyrene ("PS"), polycarbonate ("PC"), carbon fiber reinforced plastic), or any other suitable rigid material. Elongated members 12 and front-wheel-engaging member 14 may be of hollow or solid construction and may have any suitable cross section, such as rectangular (e.g., a square), circular, U-shaped (e.g., a channel), or any other suitable cross section.

Elongated members 12 may be attached to one another with connector 16. Elongated members 12 may be attached to one another at some location along the members such that the elongated members form a structure having a first portion 17 and a second portion 19. First portion 17 includes first portions 18 of elongated members 12, extending from connector 16 to free end portions 20. Second portion 19 includes second portions 22 of elongated members 12, extending from connector 16 to ground-contacting end portions 24.

Preferably, connector 16 is a structure, such as a pin, that allows elongated members 12 to pivot with respect to one another. Elongated members 12 may pivot with respect to one another, for example, in embodiments of bicycle stand 10 having an adjustable front-wheel-engaging member 14 (see, for example, FIGS. 2–7) and in embodiments of bicycle stand 10 that collapse for storage (see, for example, FIGS. 8–10). (It should be noted that there may be embodiments of bicycle stand 10 that both have an adjustable front-wheel-engaging member and collapse for storage.)

Front-wheel-engaging member 14 is attached to second portion 19 of bicycle stand 10. In the embodiment of bicycle stand 10 shown in FIG. 1A, front-wheel-engaging member is attached to elongated members 12 with connectors 25. Front-wheel-engaging member 14 may be attached to elongated members 12 at some location along second portion 22 of elongated members 12 such that front-wheel-engaging member 14 and second portions 22 form a structure that is substantially A-shaped when in position to support a bicycle frame. In some embodiments, at least one of connectors 25 may be removable so that front-wheel-engaging member 14 may pivot with respect to an elongated member 12. Front-wheel-engaging member 14 may pivot with respect to an elongated member 12, for example, in embodiments of bicycle stand 10 having an adjustable front-wheel-engaging member 14 (see, for example, FIGS. 2–7) and in embodiments of bicycle stand 10 that collapse for storage (see, for example, FIGS. 8–10). (It should be noted that there may be embodiments of bicycle stand 10 that both have an adjustable front-wheel-engaging member and collapse for storage.) In some embodiments, front-wheel-engaging member 14 may be attached to only one elongated member 12, and may maintain the orientation shown in FIG. 1A by, for example, a secure attachment to elongated member 12 with connector 25.

At stated hereinabove, bicycle stand 10 supports a bicycle frame to maintain a bicycle in an upright position. The configuration of bicycle stand 10 used to maintain the bicycle in an upright position may be referred to herein as a "support configuration." Bicycle stand 10 is oriented such that second portion 19, and in FIG. 1A ground-contacting end portions 24 of elongated members 12, contact the ground. A portion of a bicycle frame (see, for example, FIG. 15) will reside in a pocket presented by first portion 17. In the example shown in FIG. 1A, a portion of a bicycle frame will reside in substantially V-shaped region 26 of first portion 17, defined by first portions 18 of elongated members 12. In some embodiments of bicycle stand 10, a portion of V-shaped region 26 may include padding 28 to prevent damage to the bicycle frame. In some of these embodiments, padding 28 may be removable so that bicycle stand 10 can be collapsed for storage. Alternatively, padding 28 may be of a thickness such that elongated members 12 are able to pivot with respect to one another while the padding is in place, thereby achieving the configuration shown in FIGS. 9 and 10. As an alternative to using padding 28 to prevent damage to the bicycle frame, a portion of V-shaped region 26 may be coated with a plastic, such as rubber, polyethylene, polyolefin, polytetrafluoroethylene, or any other suitable plastic coating.

Figure 15:
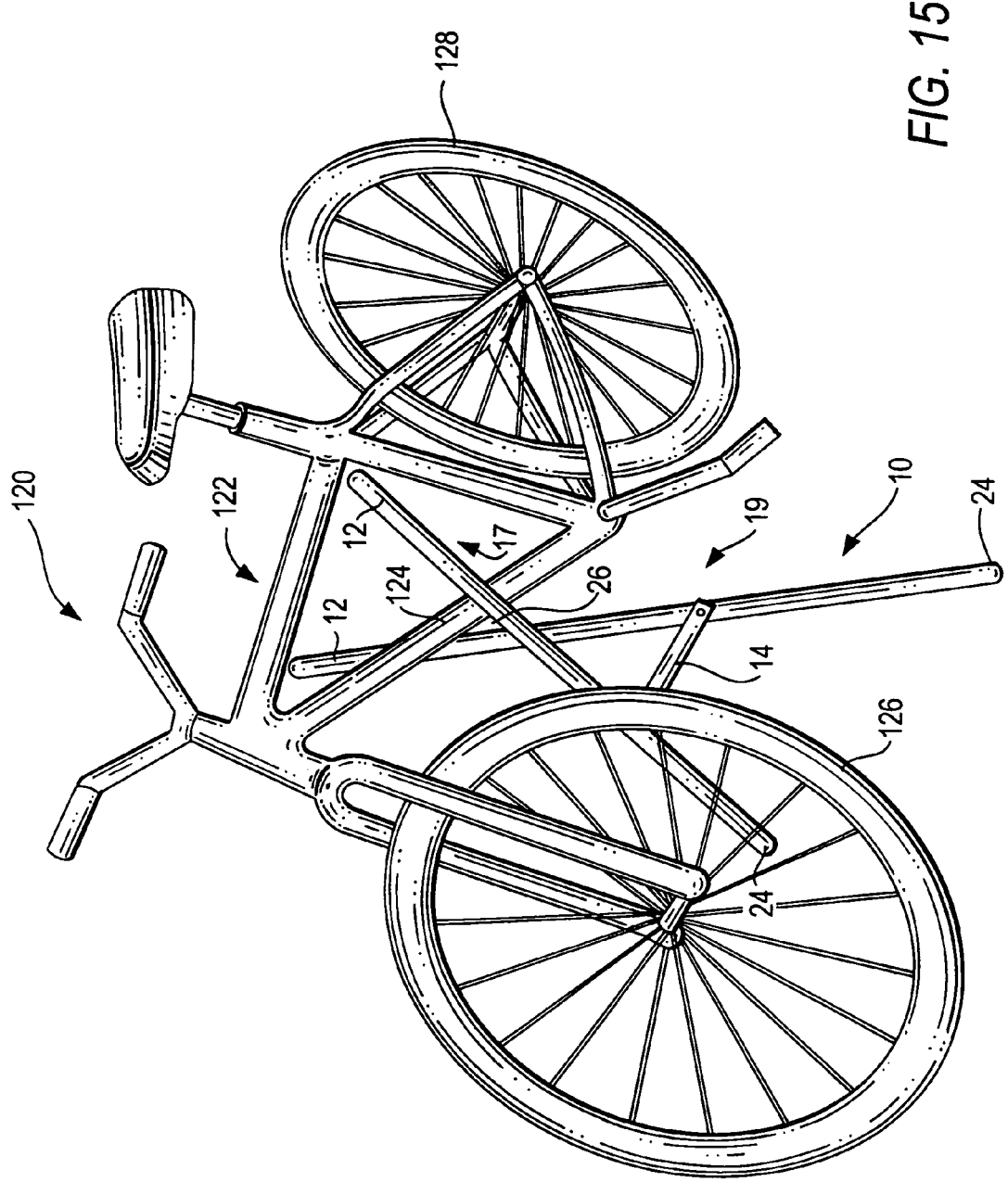
FIG. 15 is a simplified perspective view of an illustrative bicycle as supported in an upright position by the bicycle stand of FIG. 1A in accordance with the present invention.

In addition to a bicycle frame member resting in V-shaped region 26, a front wheel of a bicycle will interact with bicycle stand 10 when the bicycle stand is in use (see, for example, FIG. 15). Specifically, the front wheel of the bicycle interacts with front-wheel-engaging member 14 of second portion 19 when bicycle stand 10 is used to support the bicycle (i.e., when bicycle stand 10 is in the support configuration).

As stated hereinabove, ground-contacting end portions 24 of second portion 19 contact the ground when bicycle stand 10 is used to support a bicycle frame. In some embodiments, end portions 24 may include rubber feet 29 to enhance the stability of bicycle stand 10 when in the support configuration. It should be noted that the use of rubber feet 29 is merely illustrative, and end portions 24 may have any other suitable "feet" to enhance the stability of bicycle stand 10.

In some embodiments of the present invention, front-wheel-engaging member 14 may have a layer of a non-skid material attached to the portion of the member that contacts the front wheel of the bicycle (e.g., around the midpoint of the member) to enhance friction between the front wheel and front-wheel-engaging member. In other embodiments, the shape of front-wheel-engaging member 14 (e.g., a U-shaped channel) may enhance friction between the front wheel and front-wheel-engaging member. However, it should be noted that it is not necessary to enhance friction between the front wheel of the bicycle and front-wheel-engaging member 14, since the mere interaction of the front wheel and the front-wheel-engaging member prevents the bicycle from rolling forward or backward.

In some embodiments of the present invention, the shape of front-wheel-engaging member 14 may be such that the front-wheel-engaging member "protrudes" from the plane defined by second portions 22 of elongated members 12. For example, front-wheel-engaging member 14 may be a U-shaped channel attached to second portion 19 of bicycle stand 10 such that it extends away from second portion 19. In such an embodiment, U-shaped front-wheel-engaging member 14 interacts with a front wheel of a bicycle at some location further away from the plane defined by second portions 22, due to the protuberance of the U-shaped member from the plane.

In the embodiment shown in FIG. 1A, elongated members 12 and front-wheel-engaging member 14 are not adjustable. However, the embodiment shown in FIG. 1A is primarily shown to demonstrate the relationship between elongated members 12 and front-wheel-engaging member 14. Preferably, bicycle stand 10 is constructed with a front-wheel-engaging member and/or elongated members that are adjustable, so that the bicycle stand can accommodate bicycles of varying sizes. Various embodiments of front-wheel-engaging members that allow for adjustability of bicycle stand 10 are shown in FIGS. 2–7.

Figure 2:
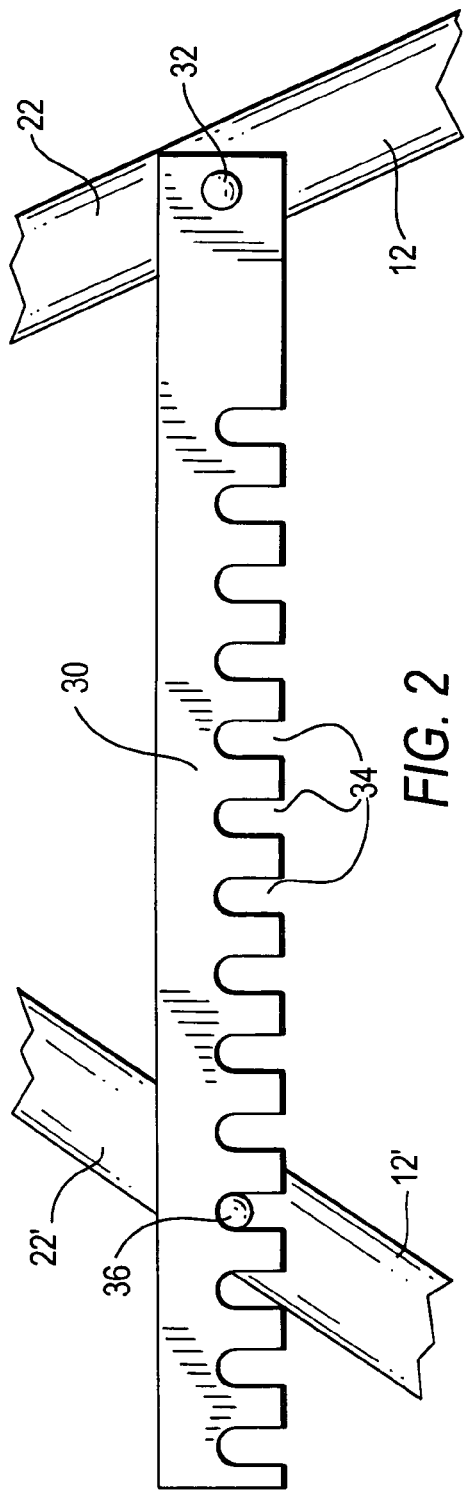
FIG. 2 is a simplified elevational view of an illustrative front-wheel-engaging member for a bicycle stand in accordance with the present invention.

FIG. 2 is a simplified elevational view of a front-wheel-engaging member 30 for bicycle stand 10 in accordance with the present invention. (Prime notation (i.e., elongated member 12' and second portion 22') is used in FIGS. 2–7 and the description herein only to differentiate between the two elongated members and the two second portions of the elongated members of bicycle stand 10.) Front-wheel-engaging member 30 may be attached to elongated member 12, and more specifically second portion 22, with connector 32. Connector 32 may be a structure such as a pin that allows front-wheel-engaging member 30 to pivot with respect to elongated member 12. Front-wheel-engaging member 30 has multiple notches 34 that interact with a pin 36 that is attached to elongated member 12', and more specifically second portion 22', to adjust the distance from the ground to both V-shaped region 26 (FIG. 1A) and front-wheel-engaging member 30. (The distance from the ground to a front-wheel-engaging member will be referred to herein as the "front-wheel-engaging member height," and the distance from the ground to V-shaped region 26 (FIG. 1A) will be referred to herein as the "V-shaped region height.")

To adjust the front-wheel-engaging member height and the V-shaped region height of bicycle stand 10, front-wheel-engaging member 30 may be disengaged from pin 36 by pivoting the front-wheel-engaging member about pin 32. To increase these heights, elongated member 12' may pivot about connector 16 (FIG. 1A) such that second portion 22' approaches second portion 22. Alternatively, to decrease these heights, elongated member 12' may pivot about-connector 16 (FIG. 1A) such that second portion 22' moves away from second portion 22. (It should be noted that, in FIGS. 2–7, the movement of elongated member 12' both toward and away from elongated member 12 is merely illustrative, and one or both of elongated members 12 and 12' may pivot about connector 16 (FIG. 1A) to adjust the height of bicycle stand 10.) Front-wheel-engaging member 30 may then pivot about pin 32 such that the desired notch 34 engages pin 36, thereby adjusting the front-wheel-engaging member height and the V-shaped region height of bicycle stand 10.

In embodiments of bicycle stand 10 in which elongated members 12 are hollow, pin 36 may be spring-loaded such that the bicycle stand can collapse for storage without having to remove pin 36 entirely from elongated member 12'. Alternatively, pin 36 may be removed from elongated member 12' so that bicycle stand 10 may collapse for storage. (Collapsing bicycle stand 10 for storage is described in more detail in connection with FIGS. 8–10.)

Figure 3:
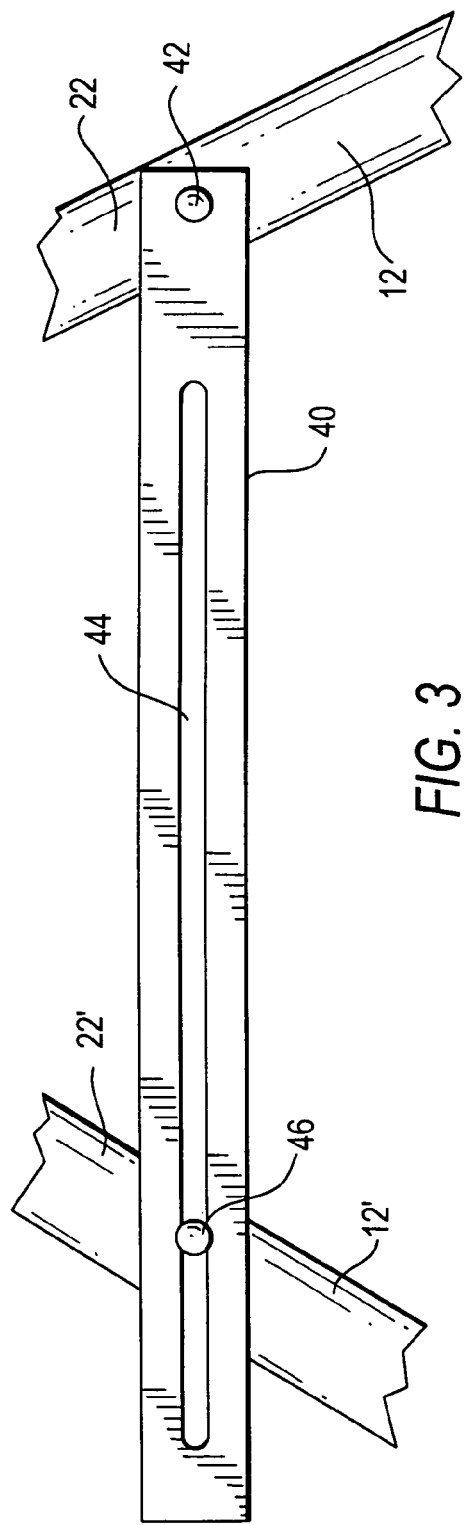
FIG. 3 is a simplified elevational view of another illustrative front-wheel-engaging member for a bicycle stand in accordance with the present invention.

FIG. 3 is a simplified elevational view of a front-wheel-engaging member 40 for bicycle stand 10 in accordance with the present invention. Front-wheel-engaging member 40 may be attached to elongated member 12, and more specifically to second portion 22, with connector 42. Connector 42 may be a structure such as a pin that allows front-wheel-engaging member 40 to pivot with respect to elongated member 12. Front-wheel-engaging member 40 has a slot 44 that interacts with a structure such as bolt 46 to adjust the front-wheel-engaging member height and the V-shaped region height of bicycle stand 10. Bolt 46, the head of which is shown in FIG. 3, may extend through elongated member 12' such that it is encapsulated by slot 44 and secured with a nut (not shown). To adjust the front-wheel-engaging member height and the V-shaped region height of bicycle stand 10, the nut (not shown) may be loosened such that slot 44 can move from side to side about bolt 46. To increase these heights, elongated member 12' may pivot about connector 16 (FIG. 1A) such that second portion 22' approaches second portion 22. Alternatively, to decrease these heights, elongated member 12' may pivot about connector 16 (FIG. 1A) such that second portion 22' moves away from second portion 22. The nut (not shown) may then be tightened such that elongated member 12' remains in the desired location, thereby adjusting the front-wheel-engaging member height and the V-shaped region height of bicycle stand 10.

In the embodiment shown in FIG. 3, to collapse bicycle stand 10 for storage, it may be necessary to remove bolt 46 and the nut (not shown) from elongated member 12'.

Figure 4:
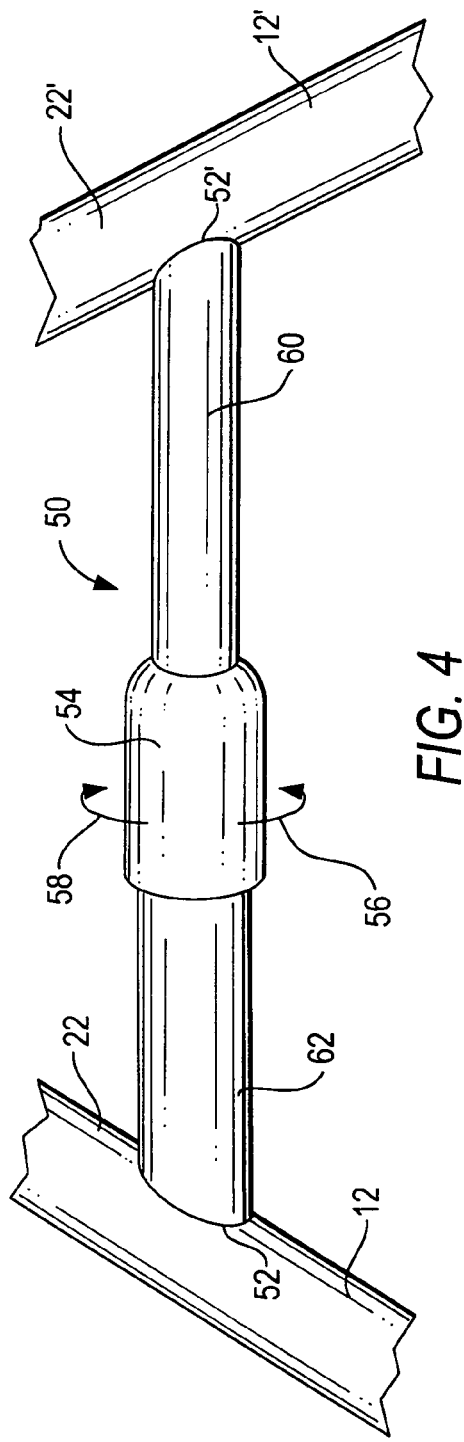
FIG. 4 is a simplified elevational view of yet another illustrative front-wheel-engaging member for a bicycle stand in accordance with the present invention.

FIG. 4 is a simplified elevational view of a front-wheel-engaging member 50 for bicycle stand 10 in accordance with the present invention. Front-wheel-engaging member 50 is adjustable in a way that is substantially similar to the adjustment of the height of a microphone stand. Front-wheel-engaging member 50 may be attached to elongated members 12 and 12' at attachment locations 52 and 52'. In the embodiment shown in FIG. 4, front-wheel-engaging member 50 and elongated members 12 and 12' have circular cross sections to facilitate interaction between the front-wheel-engaging member and elongated members at attachment locations 52 and 52'.

Front-wheel-engaging member 50 has an adjustment member 54 that may be twisted in the directions shown by arrows 56 and 58. When adjustment member 54 is twisted in the direction of arrow 56, portion 60 may be loosened from the confines of the adjustment member such that portion 60 is free to slide back and forth. When adjustment member 54 is twisted in the direction of arrow 58, portion 60 may be held tightly in place by the adjustment member, and thereby prevented from sliding back and forth. When portion 60 slides back and forth, at least a portion of portion 60 may be disposed within portion 62.

To adjust the front-wheel-engaging member height and the V-shaped region height of bicycle stand 10 (FIG. 1A), adjustment member 54 may be twisted in the direction of arrow 56 such that portion 60 can move freely from side to side. To increase these heights, elongated member 12' may pivot about connector 16 (FIG. 1A) such that second portion 22' approaches second portion 22. Alternatively, to decrease these heights, elongated member 12' may pivot about connector 16 (FIG. 1A) such that second portion 22' moves-away-from second portion 22. Adjustment member 54 may then be twisted in the direction of arrow 58 such that elongated member 12' is held in the desired location, thereby adjusting the front-wheel-engaging member height and the V-shaped region height of bicycle stand 10.

In the embodiment shown in FIG. 4, to collapse bicycle stand 10 for storage, it may be necessary to disengage front-wheel-engaging member 50 from elongated members 12 and 12' (i.e., remove attachment means found at attachment locations 52 and 52').

Figure 5:
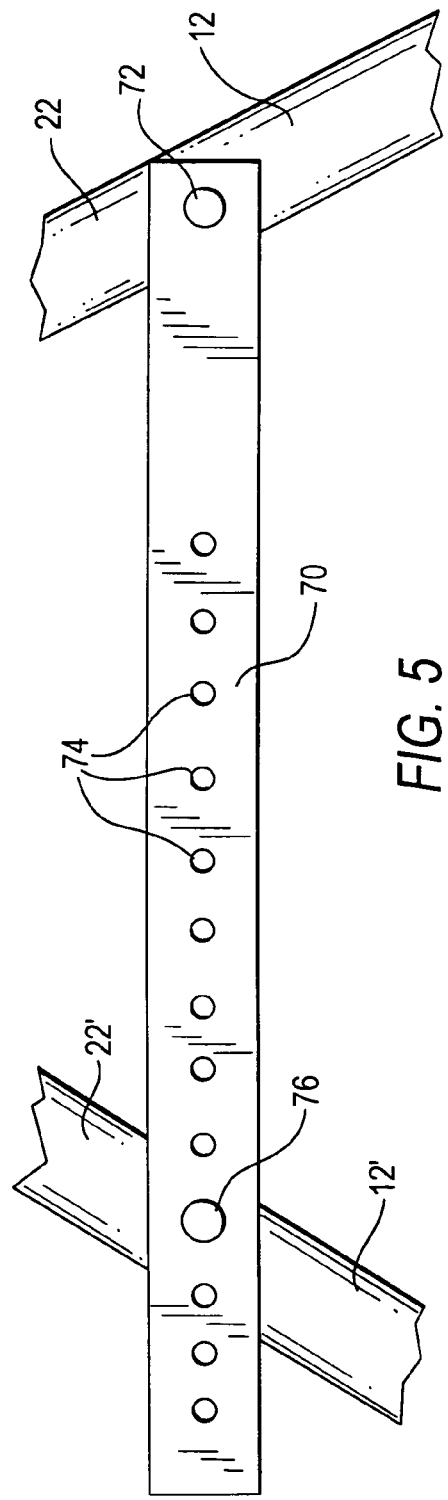
FIG. 5 is a simplified elevational view of still another illustrative front-wheel-engaging member for a bicycle stand in accordance with the present invention.

FIG. 5 is a simplified elevational view of a front-wheel-engaging member 70 for bicycle stand 10 in accordance with the present invention. Front-wheel-engaging member 70 may be attached to elongated member 12 with connector 72. Connector 72 may be a structure such as a pin that allows front-wheel-engaging member 70 to pivot with respect to elongated member 12. Front-wheel-engaging member 70 may have holes 74 that interact with bolt 76 to adjust the front-wheel-engaging member height and the V-shaped region height of bicycle stand 10. Bolt 76, the head of which is shown in FIG. 5, may extend through elongated member 12' such that it is encapsulated by one of the holes 74 and secured with a nut (not shown). To adjust the front-wheel-engaging member height and the V-shaped region height of bicycle stand 10, bolt 76 and the nut (not shown) may be removed from elongated member 12'. To increase these heights, elongated member 12' may pivot about connector 16 (FIG. 1A) such that second portion 22' approaches second portion 22. Alternatively, to decrease these heights, elongated member 12' may pivot about connector 16 (FIG. 1A) such that second portion 22' moves away from second portion 22. Bolt 76 may then be re-inserted into elongated member 12' and secured with the nut (not shown) such that elongated member 12' remains in the desired location, thereby adjusting the front-wheel-engaging member height and the V-shaped region height of bicycle stand 10.

In the embodiment shown in FIG. 5, to collapse bicycle stand 10 for storage, it may be necessary to remove bolt 76 and the nut (not shown) from elongated member 12'.

FIG. 6 is a simplified elevational view of a front-wheel-engaging member 180 for bicycle stand 10 in accordance with the present invention. Front-wheel-engaging member 180 may be attached to elongated members 12 and 12' at attachment locations 182 and 182'. In the embodiment shown in FIG. 6, front-wheel-engaging member 180 and elongated members 12 and 12' have circular cross sections to facilitate interaction between the front-wheel-engaging member and elongated members at attachment locations 182 and 182'.

Front-wheel-engaging member 180 has an outer member 184 and an inner member 186. Outer member 184 is at least partially disposed around inner member 186. To slide outer member 184 over inner member 186, pin 188 may be depressed such that the pin no longer extends through the hole 190 in outer member 184 through which it was previously disposed.

To adjust the front-wheel-engaging member height and the V-shaped region height of bicycle stand 10 (FIG. 1A), pin 188 may be depressed such that outer member 184 can slide over inner member 186. To increase these heights, elongated member 12' may pivot about connector 16 (FIG. 1A) such that second portion 22' approaches second portion 22. Alternatively, to decrease these heights, elongated member 12' may pivot about connector 16 (FIG. 1A) such that second portion 22' moves away from second portion 22. A desired hole 190 on outer member 184 may be aligned with pin 188 such that elongated member 12' is held in the desired location, thereby adjusting the front-wheel-engaging member height and the V-shaped region height of bicycle stand 10.

In some embodiments, pin 188 may be spring loaded, such that the pin "pops up" through a hole 190 as outer member 184 slides over the pin. Alternatively, pin 188 may be configured such that, when depressed, the pin emerges from the opposite side of outer member 184. In such an embodiment, outer member 184 may slide freely over inner member 186 until pin 188 is depressed from the opposite side of outer member 184 and emerges through the desired hole 190.

In the embodiment shown in FIG. 6, to collapse bicycle stand 10 for storage, it may be necessary to disengage front-wheel-engaging member 180 from elongated members 12 and 12' (i.e., remove attachment means found at attachment locations 182 and 182').

FIG. 7 is a simplified elevational view of a front-wheel-engaging member 190 for bicycle stand 10 in accordance with the present invention. Front-wheel-engaging member 190 may be attached to elongated members 12 and 12' at attachment locations 192 and 192'. In the embodiment shown in FIG. 7, front-wheel-engaging member 190 and elongated members 12 and 12' have circular cross sections to facilitate interaction between the front-wheel-engaging member and elongated members at attachment locations 192 and 192'.

Front-wheel-engaging member 190 may have multiple sections 194 that slide freely, or "telescope," within and/or around adjoining sections, thereby adjusting the front-wheel-engaging member height and the V-shaped region height of bicycle stand 10 (FIG. 1A). Each section 194 may have a detent mechanism (not shown) that locks the sections in a desired configuration. To increase these heights, elongated member 12' may pivot about connector 16 (FIG. 1A) such that second portion 22' approaches second portion 22. Alternatively, to decrease these heights, elongated member 12' may pivot about connector 16 (FIG. 1A) such that second portion 22' moves away from second portion 22.

In the embodiment shown in FIG. 7, to collapse bicycle stand 10 for storage, it may be necessary to disengage front-wheel-engaging member 190 from elongated members 12 and 12'(i.e., remove attachment means found at attachment locations 192 and 192').

As described hereinabove, FIGS. 2–7 show various embodiments of front-wheel-engaging members that allow for adjustability of the bicycle stand of the present invention. It should be noted that the embodiments of front-wheel-engaging members shown in FIGS. 2–7 are merely illustrative, and that any suitable front-wheel-engaging member design may be used to allow for adjustment of the front-wheel-engaging member height and the V-shaped region height of the bicycle stand of the present invention. Additionally, any of the front-wheel-engaging member embodiments described hereinabove, and any other suitable embodiments, may include markings along the member to delineate different bicycle sizes. For example, frame and/or tire sizes may be delineated along a front-wheel-engaging member to allow for convenient adjustment of the bicycle stand to the proper positioning for a certain bicycle.

FIGS. 8–10 demonstrate the ability of bicycle stand 10 to collapse for storage. (It should be noted that the embodiment of bicycle stand 10 shown in FIGS. 8–10 is merely illustrative, and any of the embodiments of bicycle stand 10 described herein may allow for collapsibility.) Storage, as used herein in connection with bicycle stand 10, may refer to any situation in which the bicycle stand is not being used to support a bicycle. The configuration of bicycle stand 10 when in position for storage may be referred to herein as a "storage configuration."

FIG. 8 is a simplified elevational view of an embodiment of bicycle stand 10 with front-wheel-engaging member 14 in a position for storage in accordance with the present invention. As shown in FIG. 8, front-wheel-engaging member 14 has been disengaged from elongated member 12' and rotated about connector 25. (Prime notation is used in FIGS. 8–10 and the description herein only to differentiate between the two elongated members of bicycle stand 10.) One or both of elongated members 12 and 12' may pivot about connector 16 (not shown) to attain the configuration shown in FIG. 9.

FIG. 9 is a simplified elevational view of bicycle stand 10 with front-wheel-engaging member 14 and elongated members 12 and 12' in position for storage in accordance with the present invention. FIG. 10 demonstrates the configuration of FIG. 9 as rotated 90° in the direction of arrow 80. In some embodiments, elongated members 12 and 12' may be held together in the storage configuration to prevent movement of the members with respect to one another. For example, elongated members 12 and 12' may be clipped together near one or both of end portions 20 and 24. In some embodiments, front-wheel-engaging member 14 and elongated members 12 and 12' may be held together to prevent movement of the members with respect to one another (e.g., at some location near the end of front-wheel-engaging member 14 that is detached from elongated member 12').

It should be noted that the bicycle stand of the present invention may be further minimized in size for storage by, for example, adjusting the length of the front-wheel-engaging member and/or adjusting the length of the elongated members.

As described hereinabove, the elongated members of bicycle stand 10 may be adjustable to both accommodate bicycles of differing sizes and to minimize the size of the elongated members for storage of the bicycle stand. FIGS. 11–14 demonstrate embodiment for making the elongated members of bicycle stand 10 adjustable. (For simplicity, the embodiments shown in FIGS. 11–14 will be described in terms of only one of the elongated members.)

FIG. 11 shows an elongated member 90 that includes outer members 92 and 94 and inner members 96 and 98. Outer members 92 and 94 are at least partially disposed around inner members 96 and 98, respectively. To slide outer member 92 over inner member 96, pin 100 may be depressed such that the pin no longer extends through the hole 104 in outer member 92 through which it was previously disposed. Outer member 94 may slide over inner member 98 using a substantially similar method (i.e., depress pin 102 such that it no longer extends through the hole 106 in outer member 94 through which it was previously disposed). The front-wheel-engaging member height and the V-shaped region height of bicycle stand 10 may be adjusted by aligning the desired hole 106 with pin 102.

In some embodiments, pins 100 and 102 may be spring loaded, such that the pins "pop up" through holes 104 and 106, respectively, as outer members 92 and 94 slide over the pins. Alternatively, pins 100 and 102 may be configured such that, when depressed, the pins emerge from the opposite side of elongated member 90. In such an embodiment, outer members 92 and 94 may slide freely over inner members 96 and 98 until pins 100 and 102, respectively, are depressed from the opposite side of elongated member 90 and emerge through the desired holes.

FIG. 12 demonstrates a configuration of bicycle stand 10 that minimizes the size of the stand for storage. As shown in FIG. 12, inner members 96 and 98 are disposed substantially in their entirety within outer members 92 and 94, respectively.

Figure 13:
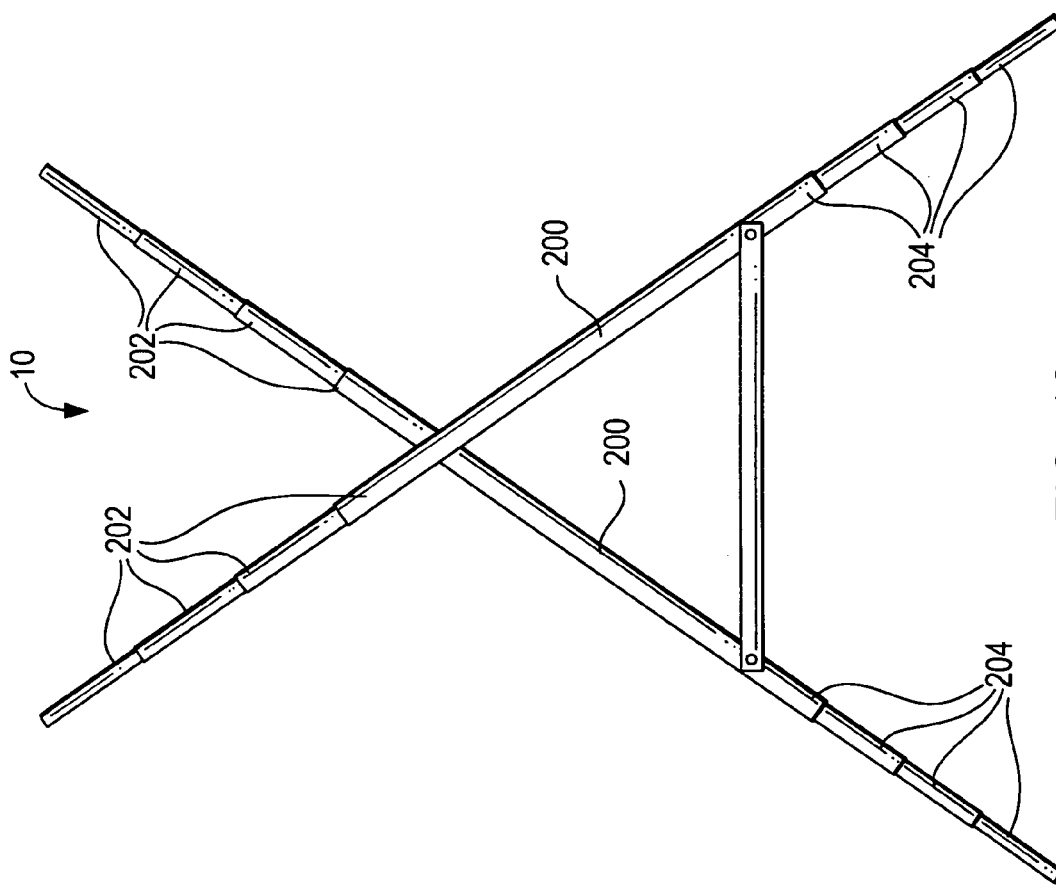
FIG. 13 is a simplified elevational view of another illustrative bicycle stand having elongated members that change in length in accordance with the present invention.

FIG. 13 shows an elongated member 200 that includes multiple sections 202 and 204 that telescope within and/or around adjoining sections. Each section 202 and 204 may have a detent mechanism (not shown) that locks the sections in a desired configuration. The front-wheel-engaging member height and the V-shaped region height of bicycle stand 10 may be adjusted by sliding sections 204 to a desired position.

Figure 14:
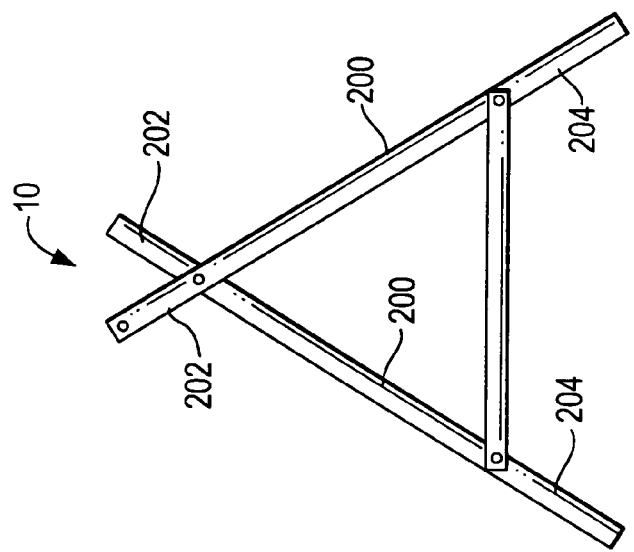
FIG. 14 is a simplified elevational view of the bicycle stand of FIG. 12 with its elongated members collapsed to a shorter length in accordance with the present invention.

FIG. 14 demonstrates a configuration of bicycle stand 10 that minimizes the size of the stand for storage. As shown in FIG. 14, each section 202 and 204 have telescoped into the adjoining section, resulting in a reduction in length of elongated member 200.

As described hereinabove, FIGS. 11–14 show embodiments of elongated members that allows for adjustability of the bicycle stand of the present invention. It should be noted that the embodiments of elongated members shown in FIGS. 11–14 are merely illustrative, and that any suitable elongated member design may be used to allow for adjustment of the front-wheel-engaging member height and the V-shaped region height of bicycle stand 10. Additionally, the elongated member embodiments described hereinabove, and any other suitable embodiment, may include markings along the member to delineate different bicycle sizes. For example, frame and/or tire sizes may be delineated along an elongated member to allow for convenient adjustment of the bicycle stand to the proper positioning for a certain bicycle.

It should be noted that bicycle stand 10 of the present invention may include any combination of the features described hereinabove, such as an adjustable front-wheel-engaging member, adjustable elongated members, collapsibility, or any other suitable feature of bicycle stand 10 described herein.

FIG. 15 is a simplified perspective view of a bicycle 120 as supported in an upright position by the bicycle stand of the present invention. It should be noted that although bicycle 120 is supported by the embodiment of bicycle stand 10 shown in FIG. 1A, bicycle 120 may be supported by any embodiment of bicycle stand 10 (e.g., an embodiment having an elongated member extending between the first and second portions, an embodiment having an adjustable front-wheel-engaging member, an embodiment having adjustable elongated members, etc.). Furthermore, bicycle stand 10 and bicycle 120 are shown in simplified form in FIG. 15 to more clearly illustrate the interaction between the bicycle and the bicycle stand.

Bicycle 120 includes a frame 122 having frame member 124. Bicycle 120 may be positioned such that frame member 124 rests within V-shaped region 26 of first portion 17. As shown in FIG. 15, frame member 124 makes contact with first portions 18 of elongated members 12 (see FIG. 1A). As described hereinabove in connection with FIG. 1A, V-shaped region 26 may be padded or coated to prevent damage to frame member 124. Bicycle 120 also includes a front wheel 126. Front wheel 126 may be positioned such that the front wheel interacts with second portion 19. As shown in FIG. 15, front wheel 126 interacts with front-wheel-engaging member 14. Front wheel 126 is prevented from rolling due to the interaction between the front wheel and front-wheel-engaging member 14.

The structure resulting from the interaction of bicycle stand 10 and bicycle 120 results in a stable configuration that is suitable for storage of the bicycle, maintenance of the bicycle (e.g., cleaning the bicycle), or any other instance when it is desired to maintain the bicycle in a stable, upright position. In some embodiments of bicycle stand 10, the interaction of bicycle stand 10 and bicycle 120 may result in a three-point structure (i.e., back wheel 128 and ground-contacting end portions 24 contact the ground). For example, in embodiments of bicycle stand 10 in which the front-wheel-engaging member is attached to the second portion of the bicycle stand at some location close to the ground, front wheel 126 of bicycle 120 may be free to rotate. In other words, front wheel 126 may not make contact with the ground. Such a configuration may be ideal for performing certain maintenance activities on front wheel 126 of bicycle 120. In other embodiments of bicycle stand 10, the interaction of bicycle stand 10 and bicycle 120 may result in a four-point structure (i.e., front wheel 126, back wheel 128, and ground-contacting end portions 24 contact the ground).

It will be understood that the foregoing is only illustrative of the principles of the invention and that various modifications can be made by those skilled in the art without departing from the scope and spirit of the invention. Many examples of such modifications have been given through the foregoing specification.

The invention claimed is:

1. For use with a bicycle having a frame defining a plane of the bicycle and a front wheel having an axle and an outermost circumference in a wheel plane perpendicular to the axle, a bicycle stand, for supporting the bicycle in an upright position with respect to a surface, comprising:
   a first portion, wherein the first portion presents a pocket to support a frame member of the bicycle in a support configuration; and
   a second portion, wherein the second portion comprises a first ground-engaging member, a second ground-engaging member, and a front-wheel-engaging member, wherein the first and second ground-engaging members contact the surface on opposite sides of the plane of the bicycle, and wherein, in the support configuration, the front-wheel-engaging member, in its interaction with the front wheel, interacts only with a portion of the outermost circumference.

2. The bicycle stand of claim 1, wherein the pocket is substantially V-shaped.

3. The bicycle stand of claim 1, wherein the pocket is substantially U-shaped.

4. The bicycle stand of claim 1, wherein an elongated member extends between the first and second portions.

5. The bicycle stand of claim 1, wherein the first and second ground-engaging members define a substantially V-shaped region in the support configuration.

6. The bicycle stand of claim 1, wherein the first and second ground-engaging members define a substantially V-shaped region in the support configuration, and wherein the front-wheel-engaging member is attached to the first ground-engaging member.

7. The bicycle stand of claim 1, wherein the first and second ground-engaging members define a substantially V-shaped region in the support configuration, and wherein the front-wheel-engaging member is attached to the first and second ground-engaging members.

8. The bicycle stand of claim 1, wherein the first portion defines a substantially V-shaped region in the support configuration, and wherein the first and second ground-engaging members define a substantially V-shaped region in the support configuration.

9. The bicycle stand of claim 1, wherein the first portion defines a substantially V-shaped region in the support configuration, wherein the first and second ground-engaging members define a substantially V-shaped region in the support configuration, wherein the first portion defines a plane of the first portion, and wherein the second portion resides in the plane of the first portion.

10. The bicycle stand of claim 1, wherein the front-wheel-engaging member is attached to the first ground-engaging member.

11. The bicycle stand of claim 1, wherein the front-wheel-engaging member is attached to the first ground-engaging member, the bicycle stand further comprising:
 a connector that attaches the front-wheel-engaging member to the first ground-engaging member.

12. The bicycle stand of claim 1, wherein the front-wheel-engaging member is attached to the first ground-engaging member, the bicycle stand further comprising:
 a connector that attaches the front-wheel-engaging member to the first ground-engaging member, wherein the connector permits rotation of the front-wheel-engaging member with respect to the first ground-engaging member.

13. The bicycle stand of claim 1, wherein the first and second ground-engaging members are attached to one another.

14. The bicycle stand of claim 1, wherein the first and second ground-engaging members are attached to one another, and wherein the first and second ground-engaging members form the first and second portions of the bicycle stand.

15. The bicycle stand of claim 1, wherein the first and second ground-engaging members are attached to one another, and wherein the first and second ground-engaging members form the first and second portions of the bicycle stand, the bicycle stand further comprising:
 a connector that attaches the first ground-engaging member to the second ground-engaging member and that permits rotation of the first and second ground-engaging members with respect to one another.

16. The bicycle stand of claim 1, wherein the first portion defines a plane of the first portion, and wherein the second portion resides in the plane of the first portion.

17. The bicycle stand of claim 1, wherein the first portion defines a plane of the first portion, wherein the second portion defines a plane of the second portion, and wherein the plane of the first portion and the plane of the second portion are different.

18. The bicycle stand of claim 1, wherein at least a portion of the pocket is padded to prevent damage to the frame member of the bicycle.

19. The bicycle stand of claim 1, wherein a distance between the surface and the pocket defines a pocket height, and wherein the front-wheel-engaging member permits adjustment of the pocket height.

20. A method for supporting a bicycle in an upright position with respect to a surface, the bicycle having a frame defining a plane of the bicycle and a front wheel having an axle and an outermost circumference in a wheel plane perpendicular to the axle, the method comprising:
 providing a bicycle stand, the bicycle stand comprising:
  a first portion, wherein the first portion presents a pocket to support a frame member of the bicycle in a support configuration; and
  a second portion, the second portion comprising a first ground-engaging member, a second ground-engaging member, and a front-wheel-engaging member, wherein the first and second ground-engaging members contact the surface on opposite sides of the plane of the bicycle, and wherein, in the support configuration, the front-wheel-engaging member, in its interaction with the front wheel, interacts only with a portion of the outermost circumference;
 positioning the first portion of the bicycle stand so that the frame member rests within the pocket of the first portion; and
 positioning the second portion of the bicycle stand so that the front-wheel-engaging member of the second portion, in its interaction with the front wheel, interacts only with the portion of the outermost circumference.

\* \* \* \* \*

UNITED STATES PATENT AND TRADEMARK OFFICE
CERTIFICATE OF CORRECTION

| | | |
|---|---|---|
| PATENT NO. | : 6,976,593 B2 | Page 1 of 1 |
| APPLICATION NO. | : 10/637933 | |
| DATED | : December 20, 2005 | |
| INVENTOR(S) | : Bradley R. Fierstein | |

It is certified that error appears in the above-identified patent and that said Letters Patent is hereby corrected as shown below:

Column 5, line 5, change "At" to --As--.

Column 13, Claim 14, line 19, delete ":" at end of line.

Signed and Sealed this

Twenty-ninth Day of August, 2006

JON W. DUDAS
*Director of the United States Patent and Trademark Office*